(12) United States Patent
Mueller

(10) Patent No.: US 6,571,581 B1
(45) Date of Patent: Jun. 3, 2003

(54) CONTACTLESS EXTRUSION APPARATUS

(75) Inventor: Peter Michael Mueller, Suwanee, GA (US)

(73) Assignee: Fitel USA Corp., Norcross, GA (US)

( * ) Notice: Subject to any disclaimer, the term of this patent is extended or adjusted under 35 U.S.C. 154(b) by 184 days.

(21) Appl. No.: 09/652,476

(22) Filed: Aug. 31, 2000

(51) Int. Cl.⁷ .............................................. C03B 19/00
(52) U.S. Cl. ........................ 65/158; 65/161; 65/182.2; 65/292; 65/393
(58) Field of Search ...................... 65/158, 161, 182.2, 65/292, 393; 425/135, 140, 387.1

(56) References Cited

U.S. PATENT DOCUMENTS 3,655,323 A * 4/1972 Hall
5,350,433 A * 9/1994 Baniel ........................ 65/388

* cited by examiner

*Primary Examiner*—Christopher A. Fiorilla
(74) *Attorney, Agent, or Firm*—Thomas, Kayden, Horstemeyer & Risley, LLP

(57) ABSTRACT

An extrusion system for producing a desired extrusion profile on a continuously moving work piece has a die containing two or more pressurized fluid extrusion cells therein, through which the work piece passes. Fluid under pressure id directed against the work piece to shape it without physical contact between the die and the work piece. The individual extrusion cells are configured to produce the desired profile, which is monitored by a non-contact metering member which applies signals to a processing unit which, in turn, applies correction signals to a pressured fluid supply module to control the pressurized fluid supply to each of the extrusion cells.

25 Claims, 4 Drawing Sheets

CONTACTLESS EXTRUSION APPARATUS

FIELD OF THE INVENTION

This invention relates to forming devices and, more particularly, to a method and apparatus for non-contact extrusion of ductile or moldable materials.

BACKGROUND OF THE INVENTION

In the manufacture of extrudable articles such as, for example, glass tubes, the tubes are heated to a state of ductility and then shaped to a desired diameter or cross-sectional shape usually by means of molds, i.e., injection molds, by which the glass tube is given the desired extrusion profile. Such a process entails compression of the glass tube, and the internal stress thus created produces varying glass internal material properties which affect the ultimate function of the glass. Thus, where the glass tube is intended for use, after subsequent processing, as a light conductor, the light conductivity can vary, because of the internal stressing, in regions within and throughout the tube to the detriment of the light conducting tube function. Heretofore, the extrusion process as described does not produce as high a degree of uniformity of the product quality as is desirable, resulting in a fairly high scrap rate. Further, the mold, which is in contact with the glass tube, contributes to the non-uniformity through wear, and thus must be replaced more often than is desirable. It is most often necessary to apply a lubricant to insure smooth movement of the work piece within the mold. The desired shaping of the tube profile is, with such a process, extremely limited in just what shape can be imparted to the tube, and, heretofore, has mainly been used to control tube diameter. In the control of tube diameter, it is usual to use a continuous process where the tube is continuously passed vertically, for example, through the mold. The mold thus compresses the tube of the desired diameter as it passes therethrough. Nonetheless, the problems of stress creation in the tube and mold wear still exist, leading to the twin results of a high rate of scrapping and mold wear. It is desirable that the tube be centered on the vertical axis for introduction into the mold. Such centering usually involves, for example, roller elements spaced around the circumference of the tube in contact therewith. The contact of the rollers often results in imparting ovality to the tube, where circularity is most desired.

SUMMARY OF THE INVENTION

The present invention is an apparatus and method for extruding ductile tubing into a desired extrusion profile, one of a wide range of profiles, or, alternatively, to producing variations in the cross-sectional configurations of the tube without any physical contact between the mold and the tube, thereby eliminating most of the aforementioned problems.

In greater detail, the apparatus comprises a generally cylindrical device or body member which surrounds the tubing to be shaped. In a preferred embodiment of the invention, the device, which may be of suitable metallic material, such as, for example, steel, has a central bore and is multi-segmented to have a pie shaped configuration. Each segment has a cavity or extrusion cell therein which opens toward the center line of the tube, with the several cell arcs totaling three hundred and sixty degrees. That portion of each cavity or cell immediately adjacent the tube, but spaced therefrom, is filled with a fluid porous member of material such as carbon of the general air bearing type shown in a brochure (not dated) of NEW WAY® Machine Components, Inc., Aston, Pa. Each segment or cell has an inlet for fluid, such as air, which communicates with the cavity for introduction of the fluid under pressure into the cell and through the porous member onto the work piece, i.e., the ductile tube. The fluid pressure in each segment can be monitored and is adjustable or controllable, preferably by means of a fluid supply and control member which can be manually adjusted or electronically programmed. By means of the pressures in each segment being individually controlled, it is possible, through pressure alone and exclusive of any contact between the device and the tube, to produce a variety of forms or extrusion profiles. Thus, the tube may be converted from a round configuration to a multi-sided configuration such as a square or, for example, a hexagon. For producing substantially straight sides, it is preferable that the porous material have a planar face facing the tube instead of an arc shaped face. The pressure control systems can be programmed to apply fluid under differing pressures to the several segment cells, either simultaneously or sequentially. It is also contemplated that in some instances the fluid can be heated to forestall the possible cooling effect of the fluid as well as to enhance the shaping effect. Thus a single segmented device, hereinafter referred to as a die, can produce substantially precise circular tubes, tapered tubes, oval tubes, square tubes, polygonal tubes, or tubes having desired diametric variations along the length thereof, with a degree of uniformity of quality and precision that materially reduces scrap product and that virtually eliminates die wear.

In other embodiments of the invention, the die may have axially spaced cavities for performing sequential shaping operations either continuously or intermittently on a tube moving axially therethrough. Alternatively, two or more dies may be stacked together to afford the same degree of flexibility or versatility to the invention or a single die may have "stacked" cells thereon.

In the various embodiments of the invention, the extruded tube may be monitored, preferably by non-contact monitoring, and the resultant monitoring signals may be fed to a processing unit which controls the fluid pressure control circuit to correct any extrusion errors that might occur.

In operation, the work piece, such as a glass tube, is heated to a ductile state, and passed through the bore of the die or dies. The fluid pressure control system applies fluid, such as air or other suitable fluid, under pressure to the die and through the die to the work piece, with the pressure in the various cells of the die being such as to mold the tube into the desired shape or extrusion profile. As the tube, which, in most cases, is continuously moving, emerges from the die, it is measured or otherwise monitored and any resultant signals thus generated are fed to the fluid pressure control module to vary some or all of the pressures, if necessary. The pressure in one or more of the segments can be varied to correct any extrusion errors.

The apparatus of the invention is also capable of producing centering of the tube on the central axis, for example, concurrently with the extrusion or molding process or prior thereto while controlling a desired profile thereof such as circularity.

The various principles and features of the present invention will be more readily understood from the following detailed description, read in conjunction with the accompanying drawings.

DETAILED DESCRIPTION

Figure 1:
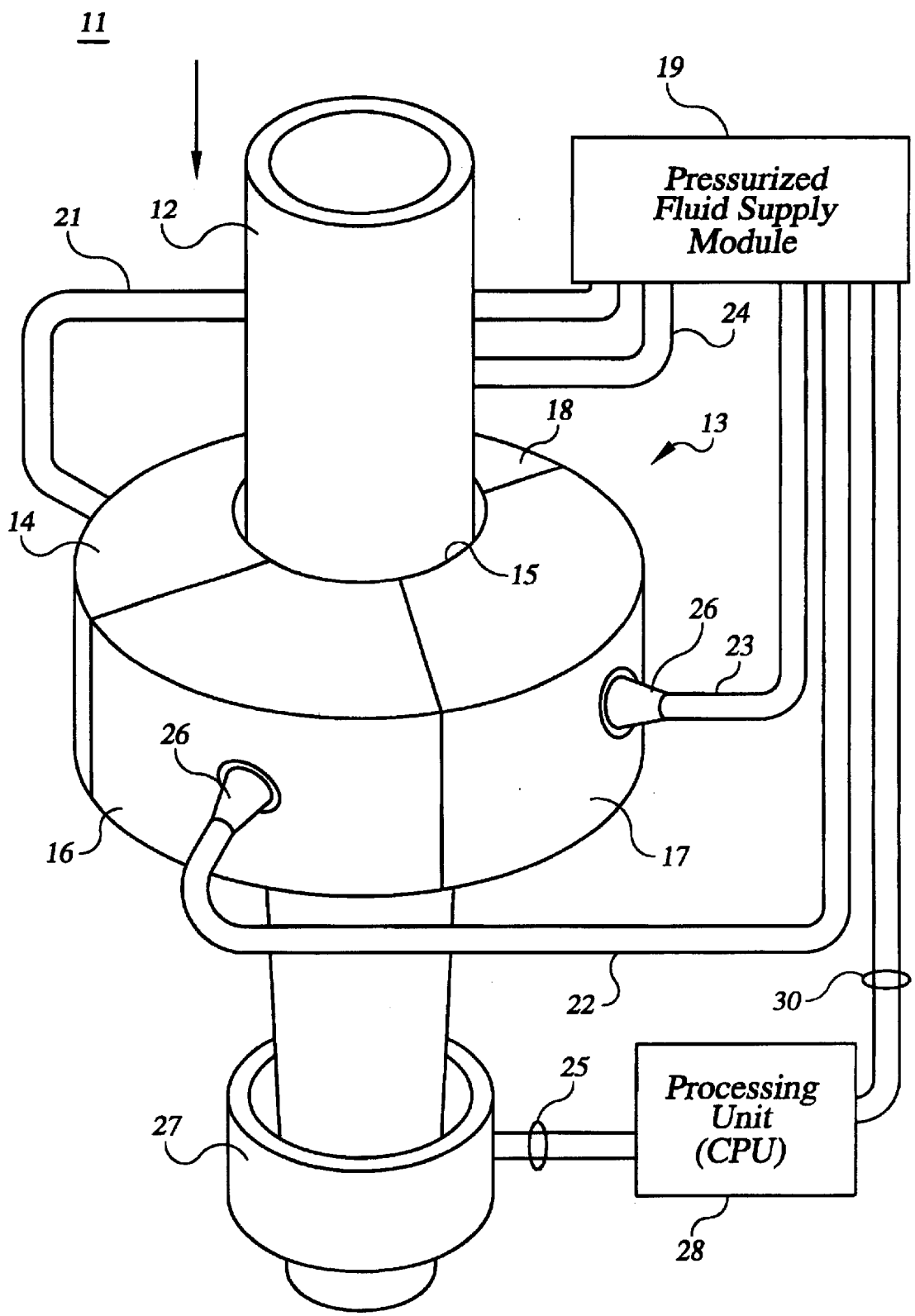
FIG. 1 depicts a perspective and diagrammatic view of an extrusion apparatus embodying the principles of the present invention.

FIG. 1 is a diagrammatic view, partially in perspective, of a system 11 of the invention for contactless extrusion to a desired extrusion profile of, for instance, a circular tubular member 12. As shown in FIG. 1, the apparatus is imparting a taper to the member 12, which is moving vertically downward through the die 13 of the invention, along a centerline without any contact between the member 12 and the apparatus. The overall system 11 comprises the die 13 of the invention, shown as being segmental into four segments 14, 16, 17, and 18, and a central bore 15 formed thereby which will be discussed more fully hereinafter. A pressurized fluid supply module 19 delivers fluid under pressure through conduits 21, 22, 23, and 24 to the respective segments 14, 16, 17, and 18 through inputs 26,26 which may be standard nipples.

The tubular member 12, after emerging from die 13, passes through a contactless metering member 27 which is programmed, in this case, to measure the taper imparted to the tubular member 12 and to generate signals indicative thereof applied through leads 25 to a central processing unit 28. The processing unit 28 determines if the extrusion profile, i.e., the taper, is within the desired tolerances of the dimensions thereof, and generates, where necessary, correction signals which are applied to the fluid module 19 through leads 30. As will be more apparent hereinafter, CPU 28 can be programmed to produce correction signals, when necessary, which are directed to module 19 to increase or decrease fluid flow and pressure in one or more of the conduits 21 through 24 independently, and corresponding to one or more of the segments 14, 16, 17, and 18 and its individual cell. Thus a close control of the extrusion process is realized. Although CPU 28 and fluid module 19 are shown as separate entities, they may be combined in a single entity.

The segmenting of the die 13, with the individual segments being removably attached to other segments by suitable means increases the versatility of the system 11 in that individual segments having different types of cells, may be introduced into the die 13 to achieve a different extrusion profile.

Figure 2:
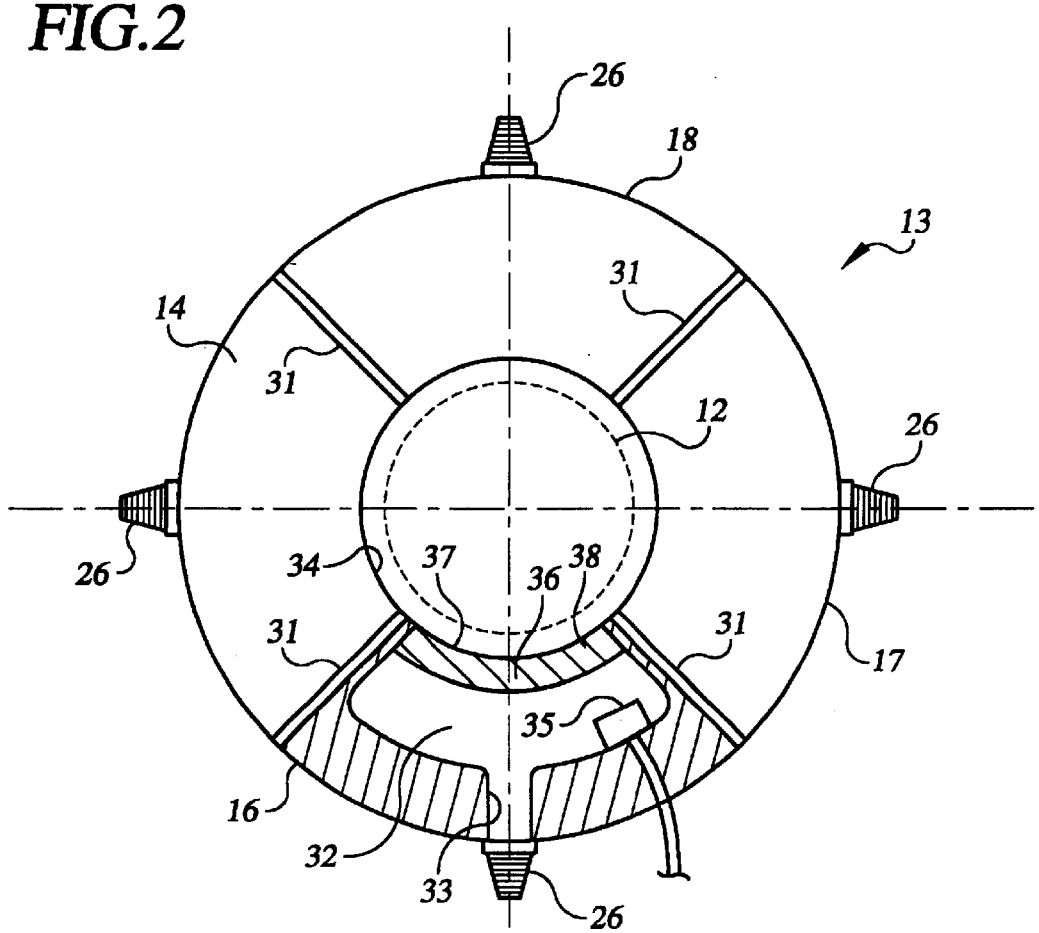
FIG. 2 is a plan view, partially in cross-section of a first embodiment of an extrusion die of the present invention.

FIG. 2 is a plan view of the die 13 with segment 16 shown in cross-section, and the tube member 12 in dashed lines. Segment 16 (and the remaining segments 14, 17, and 18) may be made of any suitable material such as steel, having as a minimum the qualities of hardness and durability as well as machineability and is attached to adjacent segments 14 and 17 by suitable means 31 as are the remaining segments to their adjacent segments. Means 31 preferably allows attachment and detachment of the various segments relative to each other, as well as holding the segment rigidly together when attached. Such attaching means 31 are well within the purview of those skilled in the art, and may take any of a number of well known configurations.

Each of the segments 14, 16, 17, and 18, as illustrated by segment 16, has a cavity 32 formed therein which communicates with nipple 26 through a passage 33, and which opens to the central bore 34 of the die 13 through which the tubular member 12 passes. Within the cavity opening and substantially filling it is a fluid porous member 36 having, in the embodiment of FIG. 2, an arc shaped surface 37 facing tube member 12. Porous member 36 when the fluid is air or gaseous is preferably made of a pressed carbonaceous material which allows fluid under pressure to pass therethrough. Such a material, formed into air bearings, is shown in the aforementioned NEW WAY® brochure. When fluid under pressure is introduced into cavity 32, it passes through member 36 which imparts a uniformity of flow thereto, into bore 34, where it bears against the ductile tube member 12. The cavity 32, passage 33 and member 36 together constitute a cell 38, and each of the segments has at least one such cell therein.

In operation, the system 11 imparts the taper shown in FIG. 1 to tubular member 12 by means of supply module 19 gradually decreasing the pressure of the fluid in all of the cells 38 in the segments 14, 16, 17, and 18. Supply module 19 supplies, throughout operation, sufficient pressurized fluid to cause tubular member 12 to "float" within bore 34, being prevented from moving into contact with any portion of the die 13. Instead of metering member 27, or preferably in addition thereto, each cell 38 may have a pressure sensitive device 35 therein for monitoring the pressure within the cell. Device 35 may be connected to the CPU 28 by suitable leads. Thus the system can be programmed on the basis of cell pressure instead of or in addition to the final extrusion profile.

Figure 3:
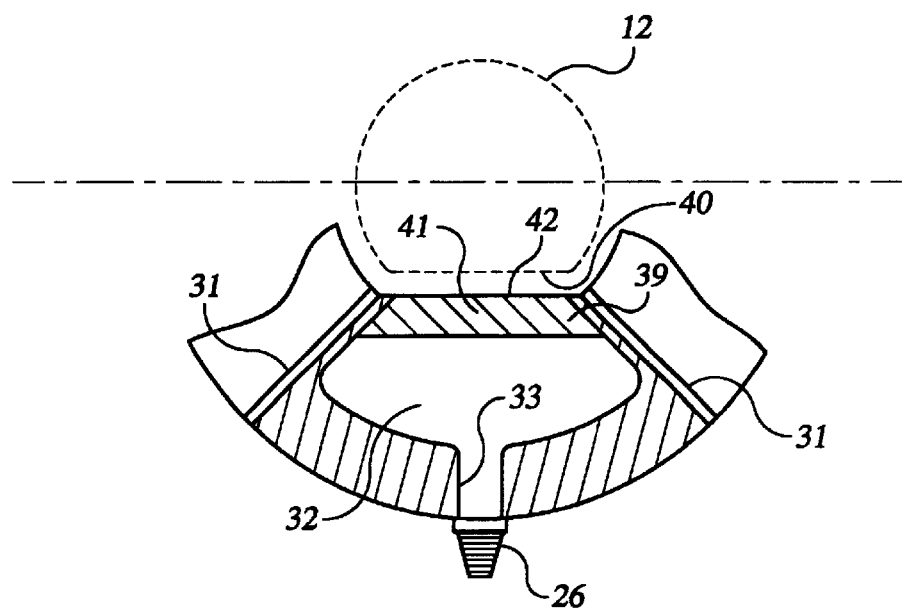
FIG. 3 is a plan view, partially in cross-section of a second embodiment of an extrusion die of the present invention.

FIG. 3 depicts a modified cell 39 which is especially designed for use where the extrusion profile of the tube 12 includes a flat, or, at least, a semi-flat surface 40 thereon. As can be seen, the porous member 41 has a planar surface 42 facing the tubular member 12 for delivery of pressurized fluid uniformly over a transverse section of the member 12. Where a plurality of flat sides are desired in the finished product, the segments 14, 16, 17, and 18 may each have a cell 39 to produce, for example, a tubular member 12 having a square cross-section.

Figure 4:
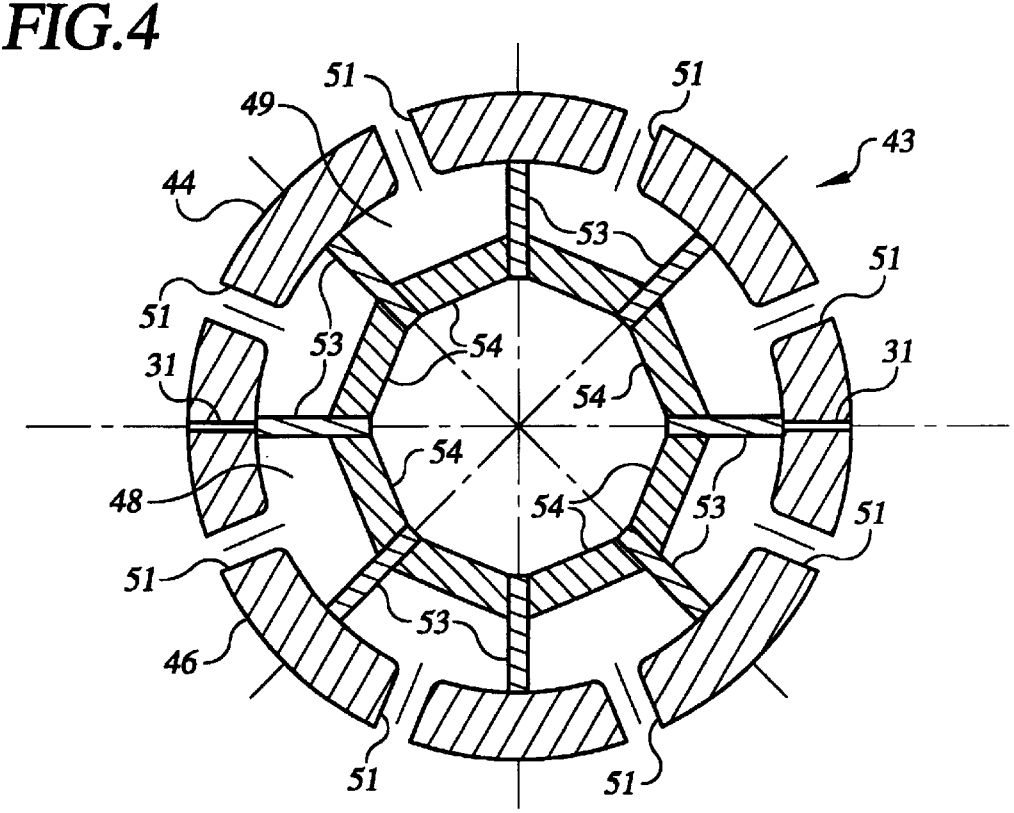
FIG. 4 is a plan view in cross-section of a third embodiment of the extrusion die of the present invention.

FIG. 4 illustrates an embodiment of the invention for producing an octagonally shaped cross-section which has its cells built up within a die 43 which comprises, for example, two segments 44 and 46 adjoined by suitable joining member 31. Each segment has full one hundred and eighty degree (180°) cavity 48 and 49 therein, and a plurality of fluid inlet passages 51 communicating therewith. With such a configuration, the desired number of cells 52 can be fabricated by the insertion of individual septa 53 into the cavities 48 and 49, with the front or inner end of the cells 52 being formed by fluid porous members 54 bridging the space between adjacent septa. The septa may be held in place by suitable attaching means, or they may be permanently affixed. When the septa 53 are removable, a great variation in extrusion profiles may be realized by the addition or removal thereof It is to be understood that an arrangement like that of FIG. 4 may also be realized by means of a greater number of segments of the type shown in FIG. 2, depending on the desired extrusion profile, with each segment containing one or more cells. Also, module 19, under control of the programmed CPU 28, may supply differing pressures of fluid to the various cells, omitting some of the cells where the desired extrusion profile calls for it.

Figure 5:
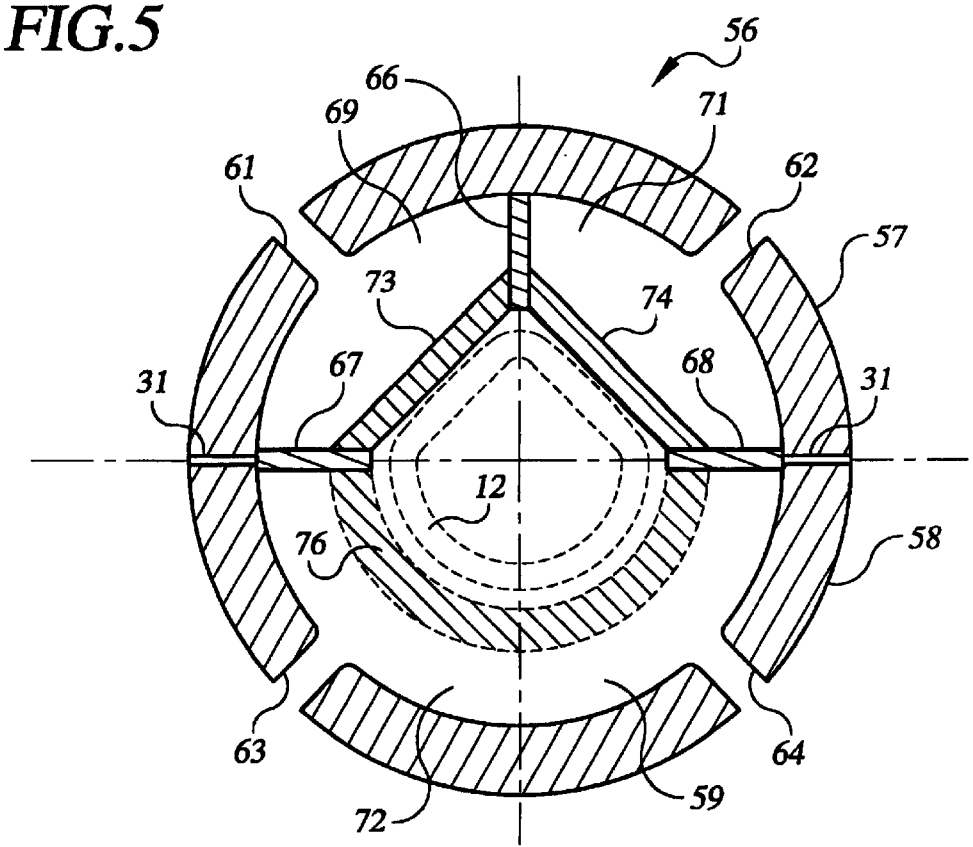
FIG. 5 is a plan view in cross-section of a fourth embodiment of the extrusion die of the present invention.

The versatility inherent in the extrusion process that is made possible by the inventive concept is perhaps best illustrated in FIG. 5 wherein a die 56, comprising two segments 57 and 58, joined by member 31, has a substantially continuous cavity 59 having a plurality of fluid inlets 61, 62, 63, and 64 thereto. Septa 66, 67, and 68 divide the die cavity 59 into three cells, 69, 71, and 72, wherein cells 69 and 71 have substantially flat surface fluid porous members 73 and 74, and large cell 72 has an arcuately shaped porous member 76. Under control of CPU 28 and module 19, the tubular member 12 may have a cross-section imparted thereto as shown in dashed lines.

Figure 6:
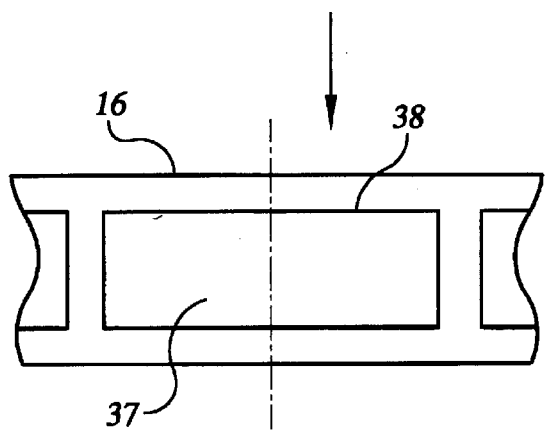
FIG. 6 is an elevation view of a detail of the extrusion die of the invention.
Figure 7:
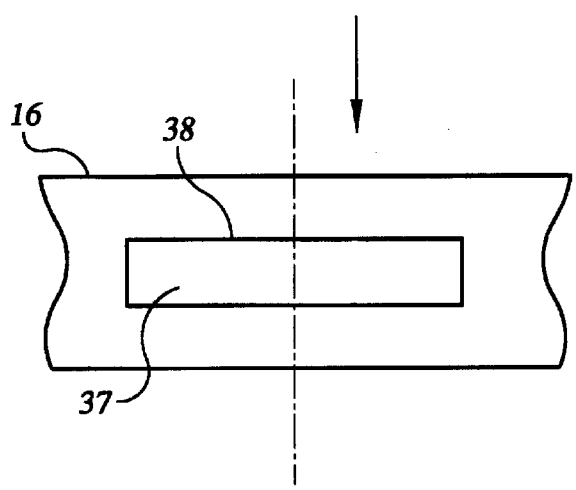
FIG. 7 is an elevation view of a detail of the extrusion die of the invention.
Figure 8:
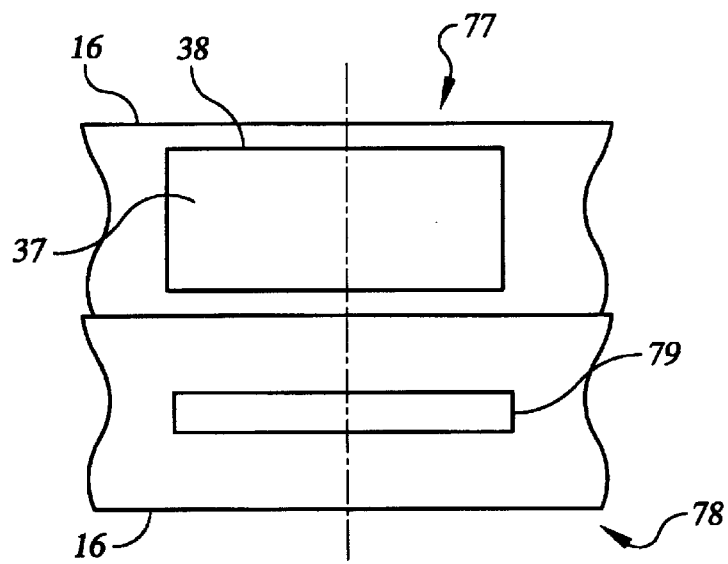
FIG. 8 is an elevation view of the detail of a modification of the extrusion die of the invention having two extrusion cells.

FIGS. 6 and 7 depict variations in the longitudinal (relative to the axial movement of member 12) dimensions of the cell opening to the member 12. The size of the opening is dependent upon the particular extrusion profile desired and can be varied over a wide range. A small opening, as shown in FIG. 7 may be used to impart relatively small or sharp changes in the extrusion profile, with the cell being intermittently turned on (application of pressurized fluid) and off (no fluid) under control of CPU 28 and module 19. An embodiment is shown in FIG. 8 wherein two dies 77 and 78 stacked together, with the top die 77 being configured substantially the same as die 13 in FIGS. 1 and 2 and lower die 78 having a narrow cell opening is determined primarily by die 77, with die 78 being used in an intermittent manner, as discussed hereinbefore, to impart, for example, a dimple of smaller diameter on member 12, at periodic intervals. It is to be understood that dies 77 and 78 may constitute a single die having upper and lower cells therein, which may number more than two cells.

It can be seen from the foregoing that the principles of the invention make possible a wide range of extrusion profiles in a contactless extrusion process, many of the profiles heretofore being difficult or impossible to achieve on a continuously moving work piece. In addition, it can be seen that the apparatus produces centering of the tube on the central axis of the apparatus either concurrently with, or prior to, the extrusion operation. In the latter case, a single 360° cell in a non-segmented die can be used, or, for ease of manufacture, a segmented die member may be used. Thus, any undesired changes to the profile of the tube are avoided.

It is to be understood that the various features of the invention might be incorporated in other types of extrusion systems, and that other modifications or adaptations of the invention might occur to workers in the art. All such variations and modifications are intended to be included herein as being within the scope of the present invention as set forth. Further, in the claims hereinafter, the corresponding structures, materials, acts and equivalents of all means or step plus function elements are intended to include any structure, material, or acts for performing the functions in combination with other elements as specifically claimed.

What is claimed is:

1. An apparatus for contactless control of the extrusion profile of a work piece traveling along a central axis, said apparatus comprising:
    a die member having a central bore substantially coaxial with the central axis, said bore having a greater transverse dimension than the outer transverse dimension of the work piece to allow contactless passage of the work piece therethrough;
    said die member having at least two fluid pressure cells therein, each having a fluid outlet facing said central axis, said cells substantially surrounding the work piece; and
    a pressurized fluid supply module for supplying fluid under pressure to each one of said fluid pressure cells for directing pressurized fluid against the work piece by means of said cells.

2. An apparatus as claimed in claim 1 wherein the fluid outlet of each of said fluid pressure cells has a fluid permeable member disposed therein.

3. An apparatus as claimed in claim 2 wherein the configuration of the fluid permeable member of at least one of said fluid pressure cells is different from the configuration of the fluid permeable member of at least one other of said fluid pressure cells.

4. An apparatus as claimed in claim 1 wherein each of said fluid pressure cells is independently connected by a separate fluid conduit to said pressurized fluid supply module.

5. An apparatus for contactless control of the extrusion profile of a work piece traveling along a central axis, said apparatus comprising:
    a die member having a central bore substantially coaxial with the central axis, said bore having a greater transverse dimension than the outer transverse dimension of the work piece to allow contactless passage of the work piece therethrough;
    at least two fluid pressure cells within said die member each having a fluid outlet faced toward the central axis for controlling the extrusion profile of the work piece, the fluid outlet of each of said fluid pressure cells having a fluid permeable member therein;
    a pressurized fluid supply module for supplying fluid under pressure to said pressure cells for directing pressurized fluid against the work piece by means of the said cells, each of said fluid pressure cells being independently connected by a separate fluid conduit to said pressurized fluid supply module; and
    a metering member for monitoring the extrusion profile of the work piece after it passes through said die and generating signals indicative thereof.

6. An apparatus as claimed in claim 5, and further comprising a processing unit for receiving signals from said metering member and applying control signals to said pressurized fluid supply module to control the fluid pressure applied to each of said fluid pressure cells through said separate fluid conduits.

7. An apparatus for contactless control of the extrusion profile of a work piece traveling along a central axis, said apparatus comprising:
    a die member having a central bore substantially coaxial with the central axis, said bore having a greater transverse dimension than the outer transverse dimension of the work piece to allow contactless passage of the work piece therethrough;
    at least two fluid pressure cells within said die member each having a fluid outlet faced toward the central axis for controlling the extrusion profile of the work piece, the fluid outlet of each of said fluid pressure cells having a fluid permeable member therein;
    a pressurized fluid supply module for supplying fluid under pressure to said pressure cells for directing pressurized fluid against the work piece by means of the said cells, each of said fluid pressure cells being independently connected by a separate fluid conduit to said pressurized fluid supply module; and
    each of said cells having a pressure sensitive device therein for measuring fluid pressure within the cell and generating signals indicative thereof.

8. An apparatus as claimed in claim 7, and further comprising a processing unit for receiving signals from said pressure sensitive devices and applying control signals to said pressurized fluid supply module.

9. An apparatus for contactless control of the extension profile of a work piece traveling along a central axis, said apparatus comprising:

a die member having a central bore substantially coaxial with the central axis, said bore having a greater transverse dimension than the outer transverse dimension of the work piece to allow contactless passage of the work piece therethrough, said die member having at least two fluid pressure cells therein, each having a fluid outlet facing the central axis and wherein said die member comprises two or more segments each having at least one pressure cell therein; and a pressurized fluid supply module for supplying fluid under pressure to said fluid pressure cells for directing pressurized fluid against the work piece by means of said cells.

10. An apparatus as claimed in claim 9, wherein said segments are joined together to form a die member surrounding path of the work piece.

11. An apparatus as claimed in claim 9, wherein at least one of said segments has first and second superposed fluid pressure cells.

12. An apparatus as claimed in claim 9, wherein said die member comprises a first group of segments superposed on a second group of segments to form a stack of segments, each having at least one fluid pressure cell therein.

13. A contactless extrusion die for imparting to a work piece passing along a central axis therethrough an extrusion profile, said die comprising:

a body member having a bore extending axially therethrough, said bore having a transverse dimension greater than the transverse dimension of the work piece so that the work piece may pass through said bore without contacting said body member;

a fluid pressure cell within said body member;

said fluid pressure cell comprising a pressurized fluid cavity, a fluid inlet to said cavity, and a fluid outlet from said cavity facing the central axis;

said fluid outlet having a fluid permeable member permeable to pressurized air disposed therein through which the pressurized fluid in said cavity passes; and wherein said body member comprises at least two segments joined together to form said bore surrounding the central axis, each of said segments having a fluid pressure cell therein.

14. A contactless extrusion die as claimed in claim 13, wherein said fluid permeable member in each of said fluid pressure cells has a front face facing said axis, said front face being configured to impart to said work piece a particular profile.

15. A contactless extrusion die as claimed in claim 14, wherein the front face of at least one of said fluid permeable members is arcuate in shape.

16. A contactless extrusion die as claimed in claim 14, wherein the front face of at least one of said fluid permeable member is flat.

17. A contactless extrusion die as claimed in claim 14, wherein said body member has a plurality of pressurized fluid cells arrayed about said central axis, each said cells having a fluid permeable member having an arcuate front face.

18. A contactless extrusion die as claimed in claim 14, wherein said body member has a plurality of pressurized cells arrayed about said central axis, each of said cells having a fluid permeable member having a flat front face.

19. A contactless extrusion die for imparting to a work piece passing along a central axis therethrough an extrusion profile, said die comprising:

a body member having a bore extending axially therethrough, said bore having a transverse dimension greater than the transverse dimension of the work piece so that the work piece may pass through said bore without contacting said body member;

at least two fluid pressure cells within said body member;

each said fluid pressure cell comprising a pressurized fluid cavity, a fluid inlet to said cavity and a fluid outlet from said cavity facing the central axis;

said fluid outlet having a fluid permeable member disposed therein through which the pressurized fluid in said cavity passes; and wherein said body member has a substantially circular cavity therein and a plurality of circumferentially spaced pressurized fluid inlets thereto, said fluid pressure cells being formed by spaced septa radially disposed within said circular cavity, each pair of sequentially occurring septa being bridged by a fluid permeable member.

20. An apparatus for contactless control of the extrusion profile of a work piece traveling along a central axis;

a die member having a central bore substantially coaxial with the central axis, said bore having a greater transverse dimension than the outer transverse dimension of the work piece to allow contactless passage of the work piece therethrough; and at least two fluid pressure cells within said die member each having a fluid outlet faced toward the outer surface of the work piece.

21. An apparatus as claimed in claim 20, wherein the fluid outlet of each of said fluid pressure cells has a fluid permeable member therein.

22. An apparatus as claimed in claim 20, and further comprising;

a pressurized fluid supply module for supplying fluid under pressure to each of said fluid pressure cells for directing pressurized fluid against the outer surface of the work piece by means of said cells.

23. An apparatus as claimed in claim 22, wherein each of said fluid pressure cells is independently connected by a separate fluid conduit to said pressurized fluid supply module.

24. An apparatus as claimed in claim 22, wherein said die member comprises two or more segments each having at least one fluid pressure cell therein.

25. An apparatus as claimed in claim 24, wherein said segments are joined together to form a die member surrounding the outer surface of the work piece.

* * * * *